July 31, 1951  J. K. NULL  2,562,328
IRRIGATION DEVICE
Filed May 25, 1948

INVENTOR.
Jesse K. Null
BY Victor J. Evans & Co.
ATTORNEYS

Patented July 31, 1951

2,562,328

UNITED STATES PATENT OFFICE 2,562,328

IRRIGATION DEVICE

Jesse K. Null, Arcadia, Calif.

Application May 25, 1948, Serial No. 29,152

2 Claims. (Cl. 299—107)

This invention relates to an irrigation device, and more particularly to an irrigation device for attachment to a garden hose.

The object of the invention is to provide an irrigation device for attachment to a hose that will efficiently irrigate plants, shrubs and the like without causing damage to the plants.

Another object of the invention is to provide an irrigation device that can be easily assembled and disassembled when necessary to replace the contents of the device.

A further object of the invention is to provide an irrigation device which is extremely simple and inexpensive to manufacture.

Other objects and advantages of the invention will be apparent during the course of the following description.

In the accompanying drawings, forming a part of this application, and in which like numerals are employed to designate like parts throughout the same:

Figure 1:
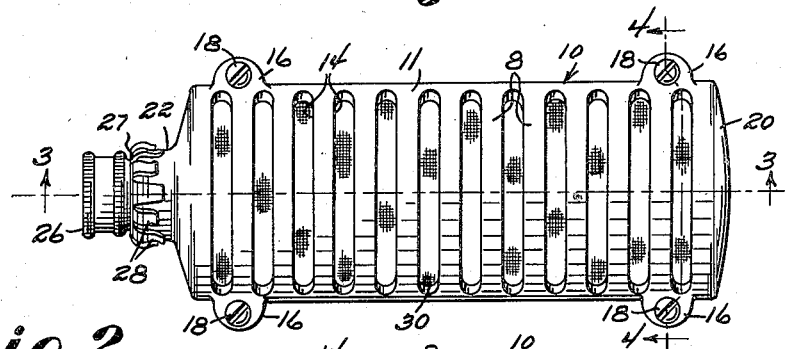
Figure 1 is a side elevational view of the device, attached to a garden hose nozzle according to the present invention.

In the drawings, wherein for the purpose of illustration, is shown a preferred embodiment of the invention, the irrigation device is indicated generally by the numeral 10 and is substantially cylindrical in shape. The device comprises the pair of symmetrical arcuate shaped body portions 11 and 12. Integral with the body portion 11 is the plurality of parallel arcuate ribs 8, the ribs 8 being arranged so as to form slots 14 between each pair of ribs for the egress therethrough of water. Integral with the body portion 12 is the plurality of arcuate ribs 13, said last-named ribs being arranged in spaced, parallel relation with respect to each other to define slots 15 for the egress therethrough of water from a source of supply.

Figure 2:
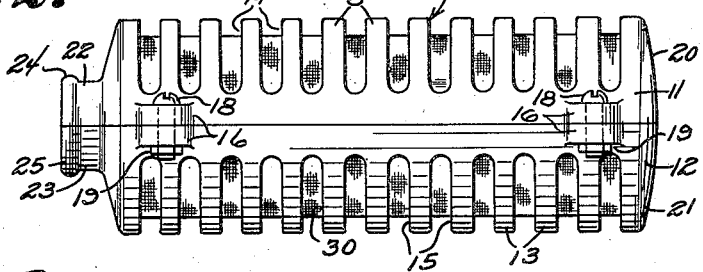
Figure 2 is a top plan view of the device, according to the present invention.
Figure 3:
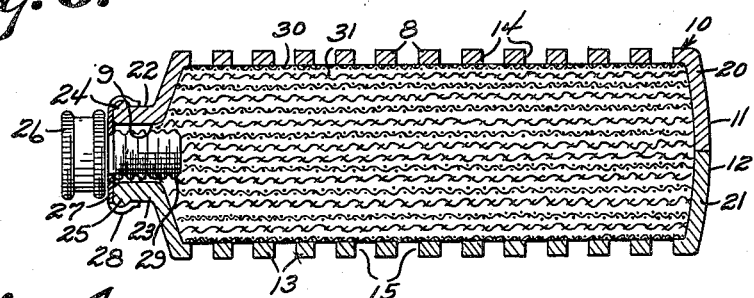
Figure 3 is a sectional view of the device, taken on the line 3—3 of Figure 1.
Figure 4:
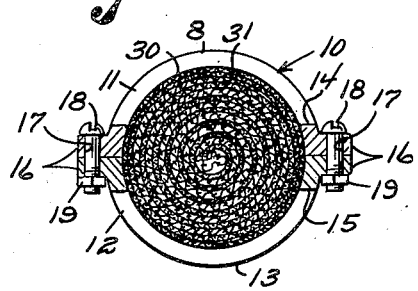
Figure 4 is a sectional view of the device, taken on the line 4—4 of Figure 1.

Projecting from each of the body portions 11 and 12 are the ears 16 having apertures 17 therein, the ears 16 of the respective body portions 11 and 12 being in alignment with each other when the device is assembled. For releasably securing the body portions 11 and 12 together, a headed bolt 18 extends through the registering apertures 17 of the ears 16 and is locked thereon by means of the castle nut 19. The body portions 11 and 12 are each provided on one end with walls 20 and 21, respectively, so that when the device is assembled and being supplied with water, the water can only flow out the slots 14 and 15. The other ends of the body portions 11 and 12 are provided with projecting necks 22 and 23 respectively, said necks defining a cylindrical socket or open mouth 9 when the body portions 11 and 12 are assembled. The necks 22 and 23 each have a complemental bead or rim 24 and 25 thereon, Figure 2.

For releasably securing the nozzle 26 of a garden hose in the open mouth 9 of the device, a clasp 27 having a plurality of gripping fingers 28 engages the beads 24 and 25. The clasp 27 has a threaded cylindrical frame 29 disposed within the open mouth 9 of the device for engaging the threaded nozzle 26.

Positioned within the housing formed by the assembled body portions 11 and 12 is the coiled screen 30 which is fabricated of galvanized wire or some such suitable reticulated material and interposed between the successive coiled layers of the coiled screen 30 is a coil of foraminous material 31, which is preferably burlap.

In use, the water is supplied under a high pressure from a source of supply and flows through the nozzle 29 into the housing formed by the assembled body portions 11 and 12 and the water is diffused as it passes through the respective reticulated coils 30 and foraminous coil 31, so that the water leaving through the slots 14 and 15 will be at a greatly reduced pressure to thereby prevent damage to the plants being irrigated. The device may be moved around from one place to another in the garden or farm with little effort and the irrigating device will readily discharge a large body of water in any area desired.

In view of the foregoing description taken in conjunction with the accompanying drawings it is thought that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In an irrigation device adapted to be secured to a threaded nozzle conveying high pressure water from a source of supply, a pair of body portions releasably fastened together to form an open mouthed housing, means in said housing for diffusing said high pressure water, there being a plurality of slots in each of said body portions for the egress therethrough of the diffused water, means embodying a threaded clasp positioned in the open mouth of said housing for engaging said threaded nozzle to thereby removably secure the latter in said open mouth.

2. An irrigation device adapted to be secured to a threaded nozzle for conveying high pressure water from a source of supply, a pair of body portions coacting together to form an open-mouthed housing, means embodying a reticulated coil and a foraminous coil in said housing for diffusing said high pressure water, there being a plurality of slots in each of said body portions for the egress therethrough of the diffused water, means embodying a threaded clasp positioned in the open mouth of said housing for engaging said threaded nozzle to thereby removably secure the latter in said open mouth, and means for releasably fastening said body portions together, said last-named means comprising a plurality of ears, each of said ears being provided with an aperture, and securing elements extending through said ears.

JESSE K. NULL.

REFERENCES CITED

The following references are of record in the file of this patent:

UNITED STATES PATENTS

| Number | Name | Date |
|---|---|---|
| 1,254,906 | Henderson | Jan. 29, 1918 |
| 1,484,575 | Shulin | Feb. 19, 1924 |
| 1,723,053 | McKinley | Aug. 6, 1929 |
| 1,989,427 | Robey | Jan. 29, 1935 |
| 2,224,450 | Scofield | Dec. 10, 1940 |
| 2,420,958 | Landreth | May 20, 1947 |

FOREIGN PATENTS

| Number | Country | Date |
|---|---|---|
| 110,800 | Australia | June 11, 1940 |